(12) United States Patent
Fong et al.

(10) Patent No.: US 11,829,586 B2
(45) Date of Patent: Nov. 28, 2023

(54) SYSTEM AND METHOD FOR REACTING TO MESSAGES

(71) Applicant: Slack Technologies, LLC, San Francisco, CA (US)

(72) Inventors: Andrew Fong, Menlo Park, CA (US); Mark Christian, San Francisco, CA (US)

(73) Assignee: Slack Technologies, LLC, San Francisco, CA (US)

(*) Notice: Subject to any disclaimer, the term of this patent is extended or adjusted under 35 U.S.C. 154(b) by 0 days.

(21) Appl. No.: 17/559,927

(22) Filed: Dec. 22, 2021

(65) Prior Publication Data
US 2023/0325056 A1   Oct. 12, 2023

Related U.S. Application Data

(63) Continuation of application No. 16/894,745, filed on Jun. 5, 2020, now Pat. No. 11,209,964.

(51) Int. Cl.
  *G06F 3/0484* (2022.01)
  *H04L 12/58* (2006.01)
  *H04L 51/42* (2022.01)

(52) U.S. Cl.
  CPC ............ *G06F 3/0484* (2013.01); *H04L 51/42* (2022.05)

(58) Field of Classification Search
  CPC .......... G06F 9/453; G06F 3/167; G06F 3/013; G06F 3/03543; G10L 15/22; G10L 15/26; H04L 65/403
  See application file for complete search history.

(56) References Cited

U.S. PATENT DOCUMENTS

| | | | |
|---|---|---|---|
| 9,959,037 B2* | 5/2018 | Chaudhri | ............... H04L 51/04 |
| 10,387,574 B1 | 8/2019 | Anders | |
| 10,445,425 B2 | 10/2019 | Jon | |
| 10,749,818 B1 | 8/2020 | Bikumala | |
| 2008/0214214 A1* | 9/2008 | Reissmueller | ........ G06F 3/0486 |
| | | | 455/466 |
| 2012/0323928 A1 | 12/2012 | Bhatia | |

(Continued)

OTHER PUBLICATIONS

"Die, Email, Die! A Flickr Cofounder Aims To Cut US All Some Slack", Readwriteweb, Lexisnexis, www.advance.lexis.com/api/permalink/33dd79e2-90f5-409d-ae27-5a2c7e86bf31/?context=1000516. (dated Aug. 14, 2013, 4:15 PM) 2 pages.

(Continued)

*Primary Examiner* — Yongjia Pan
(74) *Attorney, Agent, or Firm* — Holland & Hart LLP

(57) ABSTRACT

The present disclosure generally relates to techniques for reacting to a message in a communication platform. An exemplary method implemented at least in part by a user computing device of a user associated with a communication platform comprises: displaying the message in a message area; identifying, based on the message, one or more reactive emojis; displaying one or more graphical representations of the one or more reactive emojis; receiving, from a user, an input selecting a graphical representation of the one or more reactive graphical representations; in response to receiving the input, displaying a reaction to the message in a reaction area; and displaying a response input area for inputting a response to the message.

6 Claims, 15 Drawing Sheets

(56) References Cited

U.S. PATENT DOCUMENTS

| | | | |
|---|---|---|---|
| 2014/0082520 A1* | 3/2014 | Mamoun | H04M 1/72427 715/752 |
| 2014/0214409 A1* | 7/2014 | Leydon | G06F 40/30 704/9 |
| 2015/0149925 A1 | 5/2015 | Weksler | |
| 2015/0222586 A1 | 8/2015 | Ebersman | |
| 2015/0222617 A1* | 8/2015 | Ebersman | G06F 40/30 726/4 |
| 2015/0350118 A1 | 12/2015 | Yang | |
| 2016/0179967 A1 | 6/2016 | Sa | |
| 2016/0210963 A1* | 7/2016 | Kim | G10L 15/1822 |
| 2016/0359771 A1 | 12/2016 | Sridhar | |
| 2017/0052946 A1 | 2/2017 | Gu | |
| 2017/0083174 A1 | 3/2017 | Tobens, III et al. | |
| 2017/0131870 A1 | 5/2017 | Harper | |
| 2017/0147185 A1* | 5/2017 | Milvaney | G06F 40/169 |
| 2017/0147696 A1 | 5/2017 | Evnine | |
| 2017/0180276 A1 | 6/2017 | Gershony et al. | |
| 2017/0185581 A1 | 6/2017 | Bojja | |
| 2017/0222961 A1 | 8/2017 | Beach et al. | |
| 2017/0286366 A1 | 10/2017 | Chang | |
| 2017/0293834 A1 | 10/2017 | Raison et al. | |
| 2017/0308290 A1 | 10/2017 | Patel | |
| 2017/0336926 A1 | 11/2017 | Chaudhri | |
| 2017/0359701 A1 | 12/2017 | Sarma | |
| 2018/0081500 A1* | 3/2018 | Erant | G06F 16/9537 |
| 2018/0083895 A1 | 3/2018 | Pham | |
| 2018/0083898 A1* | 3/2018 | Pham | H04L 51/046 |
| 2018/0083901 A1 | 3/2018 | Mcgregor, Jr. et al. | |
| 2018/0136794 A1 | 5/2018 | Cassidy | |
| 2018/0137529 A1 | 5/2018 | Griffin | |
| 2018/0173692 A1 | 6/2018 | Greenberg et al. | |
| 2018/0189072 A1 | 7/2018 | Mobeen | |
| 2018/0210874 A1 | 7/2018 | Fuxman et al. | |
| 2018/0234371 A1* | 8/2018 | Lande | H04L 51/18 |
| 2018/0255009 A1 | 9/2018 | Chen | |
| 2018/0287982 A1 | 10/2018 | Draeger et al. | |
| 2018/0356957 A1 | 12/2018 | Desjardins | |
| 2019/0087086 A1 | 3/2019 | Kandur Raja et al. | |
| 2019/0122403 A1 | 4/2019 | Woo et al. | |
| 2019/0311189 A1* | 10/2019 | Bryant, III | H04L 51/04 |
| 2020/0081960 A1* | 3/2020 | Hullette | H04L 51/10 |
| 2020/0112533 A1* | 4/2020 | Anders | H04L 51/10 |
| 2020/0272287 A1 | 8/2020 | Yang et al. | |

OTHER PUBLICATIONS

"How Slack changed the way we work by putting the customer experience first", Repeat Customer Podcast, Episode 3, [online][retrieved May 9, 2019]. Retrieved from the Internet: www.zendesk.com/resources/slack-customer-experience/, (2019) 13 pages.

Adrienne LaFrance, "The Triumph of Email", Atlantic Online, Lexisnexis, www.advance.lexis.com/api/permalink/32d7ddd9-d4c1-4a73-86f7-08ab5842fde6/?context=1000516, (dated Jan. 6, 2016) 5 pages.

Andrew Hutchinson (Apr. 27, 2019). "Facebook is Testing New, More Animated Reactions," 2 pages.

David Auerbach, "Re-Animator. How Stewart Butterfield created Flickr and Slack out of the ashes of failed projects" [online][retrieved May 9, 2019]. Retrieved from the Internet: www.slate.com/business/2014/05/stewart-butterfield-flickr-and-slack-how-he-snatched-victory-from-the-jaws-of-defeat.html. (dated May 28, 2014, 2:48 PM) 8 pages.

Ernie Smith, "Picking Up The Slack", TEDIUM, [online] [retrieved May 9, 2019]. Retrieved from the Internet: www.tedium.co/2017/10/17/irc-vs-slack-chat-history/. (dated Oct. 17, 2017) 13 pages.

Fong et al., U.S. Office Action dated Mar. 23, 2021, directed to U.S. Appl. No. 16/894,745; 16 pages.

Fong et al., U.S. Office Action dated Sep. 29, 2020 directed to U.S. Appl. No. 16/894,745; 14 pages.

Internet Relay Chat, WIKIPEDIA, [online][retrieved May 30, 2019]. Retrieved from the Internet: www.wikipedia.org/wiki/Internet_Relay_Chat. (dated May 28, 2019) 20 pages.

Jonathan Vanian, "Why these startups think chat apps are the next big thing in workplace collaboration", Gigaom, Lexisnexis, www.advance.lexis.com/api/permalink/e83778c8-09c8-43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications-", FUJITSU Sci. Tech. J., 36, 2, (Dec. 2000) 154-161.

Matthew Ingram, "Flickr co-founder launches Slack, an all-in-one messaging tool designed to kill email forever", Gigaom, Lexisnexis, www.advance.lexis.com/api/permalink/0b676b7c-aec3-4560-861e-d030d1dd008c/? context=1000516, (dated Feb. 12, 2014, 7:03 PM), 2 pages.

Michael Carney, "Slack is thriving on a cocktail of whimsy and great timing", Pandodaily, Lexisnexis, www.advance.lexis.com/api/permalink/dd2d4ee5-2ddf-4d3a-a1d9-3bcee5e38b74/?context=1000516, (dated Feb. 6, 2015, 2:12 AM) 3 pages.

Mike Isaac, "Slack, a Start-Up With an App to Foster Business Collaboration, Is Valued at $1.1 Billion", The New York Times Blogs (BITS), Lexisnexis, www.advance.lexis.com/api/permalink/3eb84b34-a8f9-4d7d-9573-89d9598a4963/?context=1000516. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: www.rfc-editor.org/rfc/rfc1459.txt. (dated May 1993) 57 pages.

Rebecca Walberg, "Email biggest office waste of time: survey", National Post, At FP10, Lexisnexis, www.advance.lexis.com/api/permalink/96268e3f-26ad-48ac-a98f-6c39804ebded/?context=1000516, (dated Mar. 4, 2014) 2 pages.

Robert Hof, "Stewart Butterfield On How Slack Became A $2.8 Billion Unicorn", FORBES, [online][retrieved May 9, 2019]. Retrieved from the Internet: www.forbes.com/sites/roberthof/2015/06/02/stewart-butterfield-on-how-slack-became-a-2-8-billion-unicorn-2/#7c31937d7d9c. (dated Jun. 2, 2015, 3;25 PM), 3 pages.

The Big Pivot w/ Slack's Stewart Butterfield, Masters of Scale Podcast, Episode 13 (Aired Nov. 14, 2017), www.mastersofscale.com/#/stewart-butterfield-the-big-pivot/, (dated Jan. 17, 2018) 27 pages.

* cited by examiner

130

Acme Corp.
o Taylor Jones

≡ All Unreads
@ Threads
@ Mentions & Reactions
→ Show More

▽ ⊙ Projects
Learning-2020
Educational-Resources

▽ Channels +
General
Architecture
Engineering
Music

▽ Direct Messages +
o Erika Fleming (you)
o Johnny Rogers
o Katie Chen

🔍 Search Acme Corp.

general ☆
△ 81  Add a Topic

Taylor Jones 9:23AM
Great meeting everyone, really happy with the outcomes.

Marcel Johnson 9:23AM
I'd love to take a look at the latest report, please and thank you! 🙏

Taylor Jones 9:23AM
Ask and you shall receive!

Marcel Johnson 9:23AM
Just reviewed it and ready to provide feedback ⎬ 134
132 ⎯ 😊 1  ⎯ 136

Taylor Jones 5:16 PM
Thanks! My reaction is above. ⎬ 138

Message #general

○ Details

602
Displaying the message in a message area

604
Identifying, based on the message, one or more reactive emojis

606
Displaying one or more graphical representations of the one or more reactive emojis

608
Receiving, from a user, an input selecting a graphical representation of the one or more reactive graphical representations

610
In response to receiving the input, displaying a reaction to the message in a reaction area

612
Displaying a response area for inputting a response to the message

652
Displaying, at the user computing device, a message comprising one or more emojis in a message area, wherein the displayed message comprises one or more selectable graphical representations of the one or more emojis

654
Receiving, from a user, an input on a selectable graphical representation of the one or more selectable graphical representations in the displayed message

656
In response to receiving the input, displaying, in a reaction area different from the message area, a reaction to the message based on the selected graphical representation

FIG. 6B

SYSTEM AND METHOD FOR REACTING TO MESSAGES

CROSS-REFERENCE TO RELATED APPLICATIONS

This application is a continuation of U.S. application Ser. No. 16/894,745, filed Jun. 5, 2020, the entire contents of which is incorporated herein by reference.

FIELD OF THE INVENTION

The present disclosure relates generally to computer user interfaces, and more specifically to systems and methods for reacting to messages in a communication system.

BACKGROUND

A communication platform (e.g., messaging platform, email platform) can allow a user to react to a message using one or more emojis. For example, a group-based or channel-based communication system provides user interfaces for reacting to a message using emojis in addition to user interfaces for responding to the message. However, identifying and selecting emojis to react with can be a non-intuitive and cumbersome experience for the user. For example, the user may need to examine a large collection of emojis in order to identify the desired emojis. As another example, the user may need to enter multiple inputs to launch the appropriate emoji menu, scroll through the emoji menu, and select the desired emojis.

Accordingly, there is a need for simplified and intuitive user interfaces for reacting to messages in a communication platform.

BRIEF SUMMARY

Described herein are systems methods for reacting to messages. The present disclosure includes systems, electronic devices, methods, and non-transitory computer-readable media for implementing a communication system, and more specifically for providing user interfaces for reacting to messages within the communication system. Embodiments of the present disclosure provide simplified and intuitive user interfaces for reacting to messages in the communication platform (e.g., a group-based communication system). Such techniques can enhance the operability of the system (e.g., by helping the user to quickly identify and select desired emoji out of numerous emojis) which, additionally, reduces power usage and improves battery life of the device by enabling the user to use the system more quickly and efficiently.

As discussed above, a communication platform (e.g., messaging platform, email platform) can allow a user to react to a message using one or more emojis. For example, a group-based or channel-based communication system provides user interfaces for reacting to a message in addition to user interfaces for responding to the message. However, identifying and selecting emojis to react with can be a non-intuitive and cumbersome experience for the user. In some examples, there is limited screen real estate and it is inefficient and/or difficult to search for an emoji via emoji menus. For example, the user may need to examine a large collection of emojis in order to identify the desired emojis. As another example, the user may need to enter multiple inputs to launch the appropriate emoji menu, scroll through the emoji menu, and select the desired emojis.

The present disclosure includes techniques for providing natural and intuitive user interfaces for reacting to messages within a communication system. In some embodiments, the communication system is a channel-based messaging platform. In some embodiments, the communication system displays a message such that the emojis within the message can be directly interacted with (e.g., as selectable graphical representations). Upon receiving a user selection of an emoji within the message, the emoji can be displayed as a reaction in a reaction area. In some embodiments, the system can automatically identify emojis to recommend based on the message (e.g., based on the content and the context of the message). Once identified, the emojis can be surfaced to the user such that they can be easily selected. In some embodiments, the system surfaces the recommended emojis in the reaction area as inactive emojis (e.g., grayed-out emojis) that can be selected to switch to an active state. In some embodiments, the system surfaces the recommended emojis in one or more menus such that the recommended emojis can be more easily accessed than from a full collection emojis (e.g., with minimal scrolling).

In some embodiments, a user computing device of a user associated with a communication platform can display the message in a message area; identify, based on the message, one or more reactive emojis; display one or more graphical representations of the one or more reactive emojis; receive, from a user, an input selecting a graphical representation of the one or more reactive graphical representations; in response to receiving the input, display a reaction to the message in a reaction area; and display a response input area for inputting a response to the message.

In some embodiments, a user computing device of a user associated with a communication platform can display, at the user computing device, a message comprising one or more emojis in a message area, wherein the displayed message comprises one or more selectable graphical representations of the one or more emojis; receive, from a user, an input on a selectable graphical representation of the one or more selectable graphical representations in the displayed message; and in response to receiving the input, display, in a reaction area different from the message area, a reaction to the message based on the selected graphical representation.

DESCRIPTION OF FIGURES

For a better understanding of the various described embodiments, reference should be made to the Description of Embodiments below, in conjunction with the following drawings in which like reference numerals refer to corresponding parts throughout the figures.

FIG. 1E depicts an exemplary user interface of a group-based communication system, in accordance with some embodiments.

FIG. 2A depicts an exemplary user interface of a group-based communication system, in accordance with some embodiments.

FIG. 2I depicts an exemplary user interface for reacting to a message in a group-based communication system, in accordance with some embodiments.

FIG. 4 depicts an exemplary user interface for reacting to a message in a group-based communication system, in accordance with some embodiments.

FIG. 6A depicts a block diagram of an exemplary process for reacting to a message, in accordance with some embodiments.

FIG. 6B depicts a block diagram of an exemplary process for reacting to a message, in accordance with some embodiments.

DETAILED DESCRIPTION

Figure 1A:
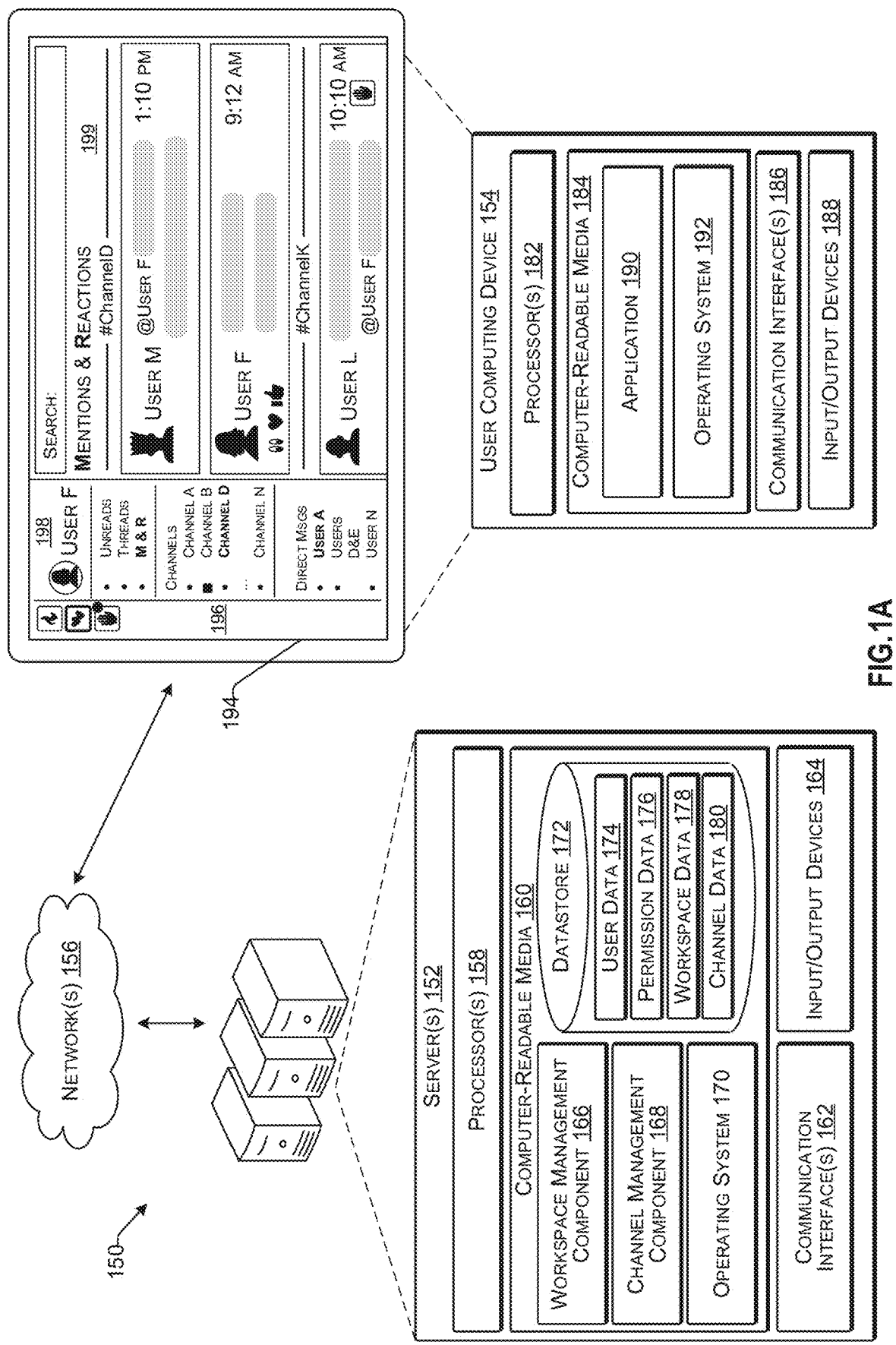
FIG. 1A depicts an exemplary communication system, in accordance with some embodiments.

The following description sets forth exemplary methods, parameters, and the like. It should be recognized, however, that such description is not intended as a limitation on the scope of the present disclosure but is instead provided as a description of exemplary embodiments.

The present disclosure includes systems, electronic devices, methods, and non-transitory computer-readable media for implementing a communication system, and more specifically for providing user interfaces for reacting to messages within the communication system. Embodiments of the present disclosure provide simplified and intuitive user interfaces for reacting to messages in the communication platform (e.g., a group-based communication system). Such techniques can enhance the operability of the system (e.g., by helping the user to quickly identify and select desired emoji out of numerous emojis) which, additionally, reduces power usage and improves battery life of the device by enabling the user to use the system more quickly and efficiently.

As discussed above, a communication platform (e.g., messaging platform, email platform) can allow a user to react to a message using one or more emojis. For example, a group-based or channel-based communication system provides user interfaces for reacting to a message in addition to user interfaces for responding to the message. However, identifying and selecting emojis to react with can be a non-intuitive and cumbersome experience for the user. In some examples, there is limited screen real estate and it is inefficient and/or difficult to search for an emoji via emoji menus. For example, the user may need to examine a large collection of emojis in order to identify the desired emojis. As another example, the user may need to enter multiple inputs to launch the appropriate emoji menu, scroll through the emoji menu, and select the desired emojis.

The present disclosure includes techniques for providing natural and intuitive user interfaces for reacting to messages within a communication system. In some embodiments, the communication system is a channel-based messaging platform. In some embodiments, the communication system displays a message such that the emojis within the message can be directly interacted with (e.g., as selectable graphical representations). Upon receiving a user selection of an emoji within the message, the emoji can be displayed as a reaction in a reaction area. In some embodiments, the system can automatically identify emojis to recommend based on the message (e.g., based on the content and the context of the message). Once identified, the emojis can be surfaced to the user such that they can be easily selected. In some embodiments, the system surfaces the recommended emojis in the reaction area as inactive emojis (e.g., grayed-out emojis) that can be selected to switch to an active state. In some embodiments, the system surfaces the recommended emojis in one or more menus such that the recommended emojis can be more easily accessed than from a full collection emojis (e.g., with minimal scrolling).

Although the following description uses terms "first," "second," etc. to describe various elements, these elements should not be limited by the terms. These terms are only used to distinguish one element from another. For example, a first graphical representation could be termed a second graphical representation, and, similarly, a second graphical representation could be termed a first graphical representation, without departing from the scope of the various described embodiments. The first graphical representation and the second graphical representation are both graphical representations, but they are not the same graphical representation.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

FIG. 1A illustrates an example environment 150 for performing techniques described herein. In at least one example, the example environment 150 can be associated with a communication platform that can leverage a network-based computing system to enable users of the communication platform to exchange data. In at least one example, the communication platform can be "group-based" such that the platform, and associated systems, communication channels, messages, and/or virtual spaces, have security (that can be defined by permissions) to limit access to a defined group of users. In some examples, such groups of users can be defined by group identifiers, as described above, which can be associated with common access credentials, domains, or the like. In some examples, the communication platform can be a hub, offering a secure and private virtual space to enable users to chat, meet, call, collaborate, transfer files or other data, or otherwise communicate between or among each other. As described above, each group can be associated with a workspace, enabling users associated with the group to chat, meet, call, collaborate, transfer files or other data, or otherwise communicate between or among each other in a secure and private virtual space. In some examples, members of a group, and thus workspace, can be associated with a same organization. In some examples, members of a group, and thus workspace, can be associated with different organizations (e.g., entities with different organization identifiers).

In at least one example, the example environment 150 can include one or more server computing devices (or "server(s)") 152. In at least one example, the server(s) 152 can include one or more servers or other types of computing devices that can be embodied in any number of ways. For example, in the example of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 152 can communicate with a user computing device 154 via one or more network(s) 156. That is, the server(s) 152 and the user computing device 154 can transmit, receive, and/or store data (e.g., content, information, or the like) using the network(s) 156, as described herein. The user computing device 154 can be any suitable type of computing device, e.g., portable, semi-portable, semi-stationary, or stationary. Some examples of the user computing device 154 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While a single user computing device 154 is shown, in practice, the example environment 150 can include multiple (e.g., tens of, hundreds of, thousands of, millions of) user computing devices. In at least one example, user computing devices, such as the user computing device 154, can be operable by users to, among other things, access communication services via the communication platform. A user can be an individual, a group of individuals, an employer, an enterprise, an organization, or the like.

The network(s) 156 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 156 are well known and are not discussed herein in detail.

In at least one example, the server(s) 152 can include one or more processors 158, computer-readable media 160, one or more communication interfaces 162, and input/output devices 164.

In at least one example, each processor of the processor(s) 158 can be a single processing unit or multiple processing units, and can include single or multiple computing units or multiple processing cores. The processor(s) 158 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 158 can be one or more hardware processors and/or logic circuits of any suitable type specifically programmed or configured to execute the algorithms and processes described herein. The processor(s) 158 can be configured to fetch and execute computer-readable instructions stored in the computer-readable media, which can program the processor(s) to perform the functions described herein.

The computer-readable media 160 can include volatile and nonvolatile memory and/or removable and non-removable media implemented in any type of technology for storage of data, such as computer-readable instructions, data structures, program modules, or other data. Such computer-readable media 160 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 152, the computer-readable media 160 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 160 can be used to store any number of functional components that are executable by the processor(s) 158. In many implementations, these functional components comprise instructions or programs that are executable by the processor(s) 158 and that, when executed, specifically configure the processor(s) 158 to perform the actions attributed above to the server(s) 152. Functional components stored in the computer-readable media can optionally include a workspace management component 166, a channel management component 168, an operating system 170, and a datastore 172.

In at least one example, the workspace management component 166 can manage workspaces. That is, in at least one example, the communication platform can be partitioned into different workspaces, which can be associated with different groups of users, as described above. As described above, each workspace can be associated with a group identifier and one or more user accounts can be mapped to, or otherwise associated with, the group identifier. User(s) corresponding to such user account(s) can be "members" of the group.

In some examples, the workspace management component 166 can manage workspace membership. That is, the workspace management component 166 can receive requests to associate users with individual workspaces and the workspace management component 166 can associate user accounts associated with such users with group identifiers associated with the individual workspaces. For example, responsive to receiving a request to add a user to a workspace, the workspace management component 166 can associate a user account of the user with a group identifier of the workspace. The workspace management component 166 can disassociate user accounts and group identifiers, for example, when a user is removed from a workspace.

In at least one example, the workspace management component 166 can manage cross-workspace data integration, as described herein. For example, the workspace management component 166 can detect updates to data associated with a workspace and can integrate such updated data into user interface(s) presented via user computing device(s) of user(s) associated with the workspace. Such data integration can be "cross-workspace" such that, regardless of which workspace a user is logged in to, the user can receive updated data associated with each of the workspaces of which he or she is a member and/or access data associated with each of the workspaces of which he or she is a member (pending permissions, as described below). That is, the workspace management component 166 can detect updates to data associated with a workspace and can integrate such updated data into user interface(s) presented via user computing device(s) of user(s) associated with the workspace. Similarly, the workspace management component 166 can facilitate cross-workspace operations. For example, the workspace management component 166 can facilitate messages between workspaces, searches between or across multiple workspaces, and the like. Additional details of operations that can be performed by the workspace management component 166 are described below.

In at least one example, the channel management component 168 can manage communication channels. As described above, in at least one example, the communication platform can be a channel-based messaging platform, that in some examples, can be usable by group(s) of users. Users of the communication platform can communicate with other users via communication channels. A communication channel, or virtual space, can be a data route used for exchanging data between and among systems and devices associated with the communication platform. In at least one example, the channel management component 168 can establish a communication channel between and among various user computing devices, allowing the user computing devices to communicate and share data between and among each other. In at least one example, the channel management component 168 can manage such communications and/or sharing of data. In some examples, data associated with a communication channel can be presented via a user interface. In at least one example, the channel management component 168 can interact with the workspace management component 166 to manage the generation, presentation, and/or updating of user interfaces. Additional details of operations that can be performed by the channel management component 168 are described below.

In at least one example, the operating system 170 can manage the processor(s) 158, computer-readable media 160, hardware, software, etc. of the server(s) 152.

In at least one example, the datastore 172 can be configured to store data that is accessible, manageable, and updatable. In some examples, the datastore 172 can be integrated with the server(s) 152, as shown in FIG. 1A. In other examples, the datastore 172 can be located remotely from the server(s) 152 and can be accessible to the server(s) 152 and/or user device(s), such as the user device 154. The datastore 172 can comprise multiple databases, which can include user data 174, permission data 176, workspace data 178, and channel data 180. Additional or alternative data may be stored in the data store and/or one or more other data stores.

In at least one example, the user data 174 can store data associated with users of the communication platform. In at least one example, the user data 174 can store data in user profiles (which can also be referred to as "user accounts"), which can store data associated with a user, including, but not limited to, one or more user identifiers associated with multiple, different organizations or entities with which the user is associated, one or more communication channel identifiers associated with communication channels to which the user has been granted access, one or more group identifiers for groups (or, organizations, teams, entities, or the like) with which the user is associated, an indication whether the user is an owner or manager of any communication channels, an indication whether the user has any communication channel restrictions, a plurality of messages, a plurality of emojis, a plurality of conversations, a plurality of conversation topics, an avatar, an email address, a real name (e.g., John Doe), a username (e.g., j doe), a password, a time zone, a status, a token, and the like.

In at least one example, the permission data 176 can store data associated with permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with an individual user can be mapped to, or otherwise associated with, an account or profile associated with the user data 174. In some examples, permissions can indicate which users can communicate directly with other users, which channels a user is permitted to access, restrictions on individual channels, which workspaces the user is permitted to access, restrictions on individual workspaces, and the like. In at least one example, the permissions can support the communication platform by maintaining security for limiting access to a defined group of users. In some examples, such users can be defined by common access credentials, group identifiers, or the like, as described above.

In at least one example, the workspace data 178 can store data associated with individual workspaces. As described above, the communication platform can be partitioned into workspaces associated with groups of users. In at least one example, a group identifier can be associated with a workspace. In at least one example, the group identifier can indicate a physical address in the workspace data 178 where data related to the corresponding workspace is stored. In at least one example, data associated with workspace permissions can be stored in association with the group identifier, data identifying users associated with the workspace can be stored in association with the group identifier, data associated with messages and/or other content associated with the workspace can be stored in association with the group identifier, data associated with communication channels associated with the workspace can be stored in association with the group identifier, and the like. In some examples, workspaces can be associated with one or more organization identifiers, which can be associated with organizations or other entities associated with the communication platform. In some examples, such data can be mapped to, or otherwise associated with, other types of data in the datastore 172 (e.g., the user data 174, the permission data 176, the channel data 180, etc.).

In at least one example, the channel data 180 can store data associated with individual communication channels. In at least one example, the channel management component 168 can establish a communication channel between and among various user computing devices, allowing the user computing devices to communicate and share data between and among each other. In at least one example, a communication channel identification may be assigned to a communication channel, which indicates the physical address in the channel data 180 where data related to that communication channel is stored. A communication channel may be "public," which may allow any user within an organization (e.g., associated with an organization identifier) to join and participate in the data sharing through the communication channel, or a communication channel may be "private," which may restrict data communications in the communication channel to certain users or users having particular roles (e.g., managers, administrators, etc.). In some examples, a communication channel may be "shared," which may allow users associated with different organizations (e.g., entities associated with different organization identifiers) to join and participate in the data sharing through the communication channel. Shared channels may be public such that they are accessible to any user of either organization, or they may be private such that they are restricted to access by certain users or users having particular roles from both organizations.

In some examples, the datastore 172 can be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with organizations, groups (e.g., workspaces), communication channels, users, or the like.

In some examples, individual organizations can be associated with a database shard within the datastore 172 that stores data related to a particular organization identification. For example, a database shard may store electronic communication data associated with members of a particular organization, which enables members of that particular organization to communicate and exchange data with other members of the same organization in real time or near-real time. In this example, the organization itself can be the owner of the database shard and has control over where and how the related data is stored. In some examples, a database shard can store data related to two or more organizations (e.g., as in a shared channel).

In some examples, individual groups can be associated with a database shard within the datastore 172 that stores data related to a particular group identification (e.g., workspace). For example, a database shard may store electronic communication data associated with members of a particular group, which enables members of that particular group to communicate and exchange data with other members of the same group in real time or near-real time. In this example, the group itself can be the owner of the database shard and has control over where and how the related data is stored.

In some examples, a communication channel can be associated with a database shard within the datastore 172 that stores data related to a particular channel identification. For example, a database shard may store electronic communication data associated with the communication channel, which enables members of that particular communication channel to communicate and exchange data with other members of the same communication channel in real time or near-real time. In this example, a group or organization can be the owner of the database shard and can control where and how the related data is stored.

In some examples, individual users can be associated with a database shard within the datastore 172 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored.

The communication interface(s) 162 can include one or more interfaces and hardware components for enabling communication with various other devices (e.g., the user computing device 154), such as over the network(s) 156 or directly. In some examples, the communication interface(s) 162 can facilitate communication via Websockets, Application Programming Interfaces (APIs) (e.g., using API calls), HypterText Transfer Protocols (HTTPs), etc.

The server(s) 152 can further be equipped with various input/output devices 164 (e.g., I/O devices). Such I/O devices 164 can include a display, various user interface controls (e.g., buttons, joystick, keyboard, mouse, touch screen, etc.), audio speakers, connection ports and so forth.

In at least one example, the user computing device 154 can include one or more processors 182, computer-readable media 184, one or more communication interfaces 186, and input/output devices 188.

In at least one example, each processor of the processor(s) 182 can be a single processing unit or multiple processing units, and can include single or multiple computing units or multiple processing cores. The processor(s) 182 can comprise any of the types of processors described above with reference to the processor(s) 158 and may be the same as or different than the processor(s) 158.

The computer-readable media 184 can comprise any of the types of computer-readable media 184 described above with reference to the computer-readable media 160 and may be the same as or different than the computer-readable media 160. Functional components stored in the computer-readable media can optionally include at least one application 190 and an operating system 192.

In at least one example, the application 190 can be a mobile application, a web application, or a desktop application, which can be provided by the communication platform or which can be an otherwise dedicated application. In some examples, individual user computing devices associated with the environment 150 can have an instance or versioned instance of the application 190, which can be downloaded from an application store, accessible via the Internet, or otherwise executable by the processor(s) 182 to perform operations as described herein. That is, the application 190 can be an access point, enabling the user computing device 154 to interact with the server(s) 152 to access and/or use communication services available via the communication platform. In at least one example, the application 190 can facilitate the exchange of data between and among various other user computing devices, for example via the server(s) 152. In at least one example, the application 190 can present user interfaces, as described herein. In at least one example, a user can interact with the user interfaces via touch input, keyboard input, mouse input, spoken input, or any other type of input.

A non-limiting example of a user interface 194 is shown in FIG. 1A. As illustrated in FIG. 1A, the user interface 194 can present data associated with one or more communication channels and, in some examples, one or more workspaces. That is, in some examples, the user interface can integrate data from multiple workspaces into a single user interface so that the user (e.g., of the user computing device 154) can access and/or interact with data associated with the multiple workspaces that he or she is associated with and/or otherwise communicate with other users associated with the multiple workspaces. In some examples, the user interface 194 can include a first region 196, or pane, that includes indicator(s) (e.g., user interface element(s) or object(s)) associated with workspace(s) with which the user (e.g., account of the user) is associated. In some examples, the user interface 194 can include a second region 198, or pane, that includes indicator(s) (e.g., user interface element(s) or object(s)) representing data associated with the workspace (s) with which the user (e.g., account of the user) is associated.

In at least one example, the user interface 194 can include a third region 199, or pane, that can be associated with a data feed (or, "feed") indicating messages posted to and/or actions taken with respect to one or more communication channels and/or other virtual spaces for facilitating communications (e.g., a virtual space associated with direct message communication(s), a virtual space associated with event(s) and/or action(s), etc.) as described herein. In at least one example, data associated with the third region 199 can be associated with the same or different workspaces. That is, in some examples, the third region 199 can present data associated with the same or different workspaces via an integrated feed. In some examples, the data can be organized and/or is sortable by workspace, time (e.g., when associated data is posted or an associated operation is otherwise performed), type of action, communication channel, user, or the like. In some examples, such data can be associated with an indication of which user (e.g., member of the communication channel) posted the message and/or performed an action. In examples where the third region 199 presents data associated with multiple workspaces, at least some data can be associated with an indication of which workspace the data is associated with.

In at least one example, the operating system 192 can manage the processor(s) 182, computer-readable media 184, hardware, software, etc. of the server(s) 152.

The communication interface(s) 186 can include one or more interfaces and hardware components for enabling communication with various other devices (e.g., the user computing device 154), such as over the network(s) 156 or directly. In some examples, the communication interface(s) 186 can facilitate communication via Websockets, APIs (e.g., using API calls), HTTPs, etc.

The user computing device 154 can further be equipped with various input/output devices 188 (e.g., I/O devices). Such I/O devices 188 can include a display, various user interface controls (e.g., buttons, joystick, keyboard, mouse, touch screen, etc.), audio speakers, connection ports and so forth.

While techniques described herein are described as being performed by the workspace management component 166, the channel management component 168, and the application 190, techniques described herein can be performed by any other component, or combination of components, which can be associated with the server(s) 152, the user computing device 154, or a combination thereof.

FIGS. 1B-5 illustrate exemplary techniques including exemplary user interfaces ("UP") for reacting to a message, in accordance with some embodiments. These figures are also used to illustrate the processes described below, including the processes in FIGS. 6A-B.

FIGS. 1B-E illustrate exemplary user interfaces of a group-based communication system, in accordance with some embodiments. In some embodiments, the user interfaces are displayed at an electronic device. The electronic device can be a client device or user device of the group-based communication system. The client device can be a desktop computer, a laptop computer, a smartphone, a netbook, a tablet computer, a wearable device, etc. The client device is in communication with one or more servers of the group-based communication system, as described in detail herein.

A group-based communication system can support communication and collaboration among one or more groups of users. Specifically, a group-based communication system can provide a virtual communication environment that is accessible to only a defined group of users in the group-based communication system. The group-based communication channel can provide user interfaces for displaying communications posted by channel members. The virtual communication environment is also referred to as a "group-based communication channel" or "channel." In some embodiments, two different channels can be associated with the same group of users in the group-based communication system.

The defined group of users can include users from an organization (e.g., all or a subset of employees in a company) or users from multiple organizations (e.g., a subset of employees in company A and a subset of employees in company B). In some embodiments, access to a channel can be granted to a non-member user by a member user of a channel (e.g., by validating a request to join, by sending an invitation to join).

In some embodiments, a group-based communication system includes a channel list pane. The channel list pane is configured to display one or more lists of group-based communication channels accessible to a user. The channel list pane can further include user affordances for indicating which channel has new messaging communications and for selecting channels. The channel list pane can include additional information, such as notifications, channel names, name of the user, etc.

In some embodiments, the group-based communication system includes a thread communication pane. The thread communication pane is configured to display a selected group-based communication channel. For example, the thread communication panel can include user interfaces for displaying messages. A message can comprise digital content such as text data, image data, video data, audio data, attachments, workflows, objects, or any combination thereof. The message can be associated with metadata (e.g., a sending user identifier, a message identifier, a global identifier, a group-based communication channel identifier, a timestamp). The messages can be organized in one or more threads. A channel member can respond to and/or react to a message, as described in detail below.

Figure 1B:
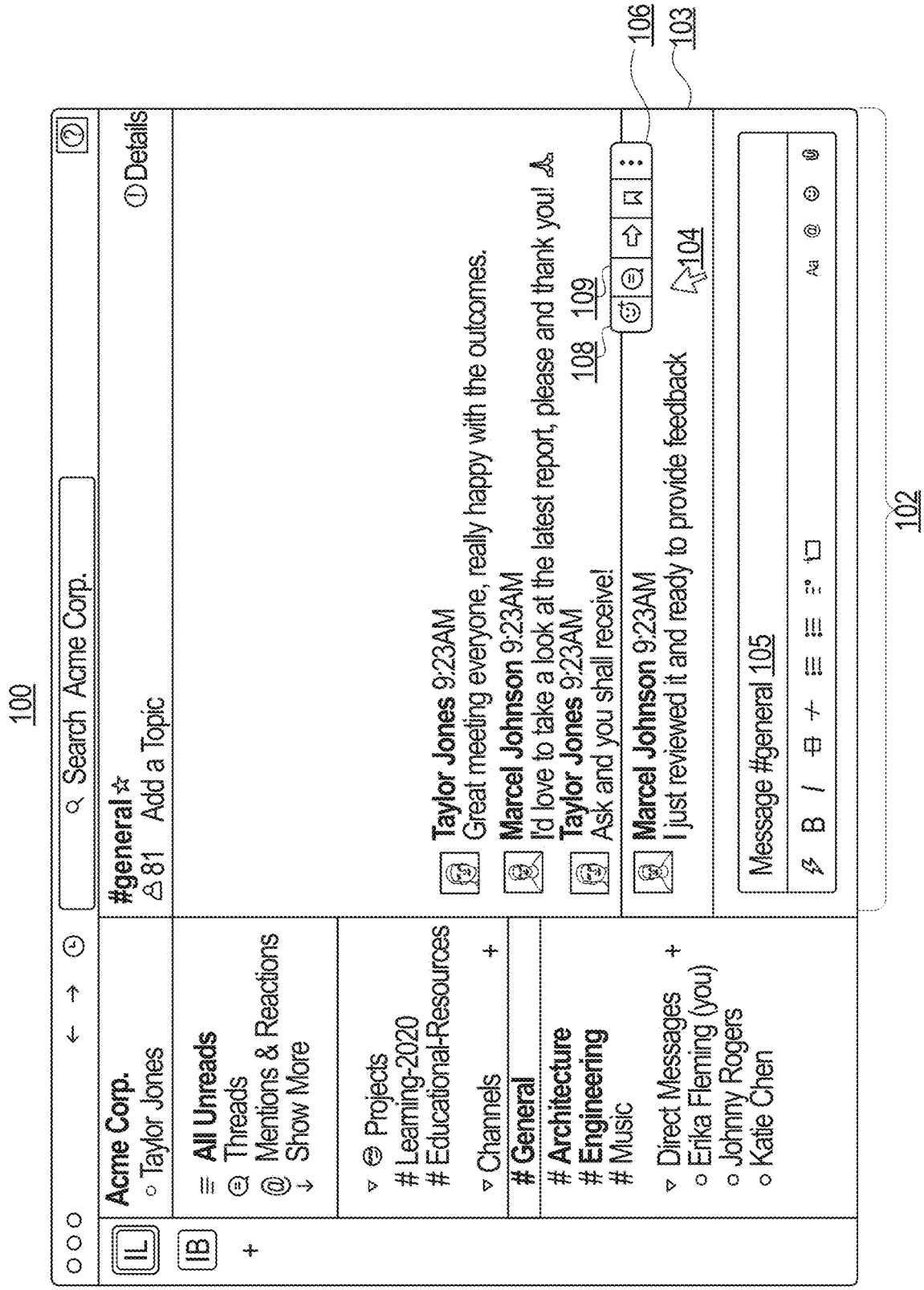
FIG. 1B depicts an exemplary user interface of a group-based communication system, in accordance with some embodiments.

With reference to FIG. 1B, user interface 100 is a user interface of a group-based communication system (e.g., FIG. 1A) and comprises a channel list pane displaying a plurality of group-based communication channels ("#General," "#Architecture," "#Engineering," and "#Music"). Each channel provides a virtual communication environment or feed that is configured to display messaging communications posed by channel members (e.g., validated users accessing the environment using client devices). In the depicted example, the user, Taylor Jones, has a member of the four listed channels.

In the depicted example in FIG. 1B, the "#General" channel has been selected in the communication system. Accordingly, thread communication pane 102 of the user interface 100 displays information associated with the selected group-based communication channel. The thread communication pane may include a variety of information, such as messaging communications, and may include a variety of actuators for initiating requests.

The user interface 100 allows the user to react to a message, respond to the message, or both. As depicted example, upon a user selection of a given message 103 (e.g., via a mouse hover input indicated by cursor 104) in a message area, a menu 106 is displayed. The menu 106 includes a user affordance 108 for reacting to the selected message and a user affordance 109 for responding to the selected message in a thread. The user can also respond to the message using the text box 105.

The group-based communication platform allows the user to react to a message (e.g., using one or more emojis) and to respond to the message (e.g., by composing a new message, which may include one or more emojis, one or more text strings, one or more attachments, or any combination thereof). As described below, the user interfaces for inputting reactions and responses are distinct; further, the user interfaces for displaying reactions and responses are distinct as well.

Figure 1C:
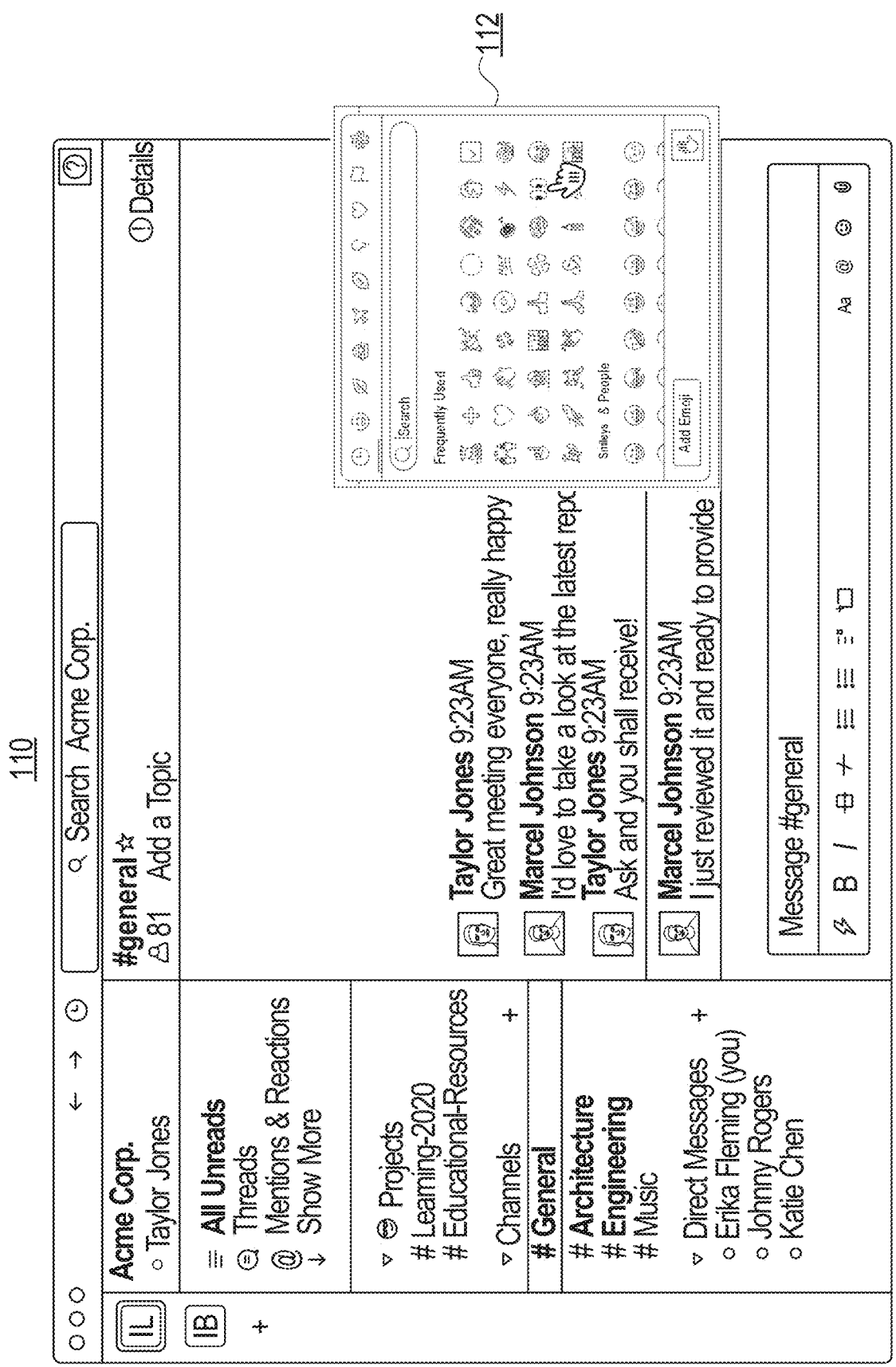
FIG. 1C depicts an exemplary user interface of a group-based communication system, in accordance with some embodiments.

Upon a user selection of the user affordance 108, the electronic device displays one or more user interfaces for reacting to the message. With reference to FIG. 1C, the electronic device displays an emoji menu 112. The emoji menu comprises one or more collections of emojis, such as a collection of frequently used emojis (frequency of usage by the user above a predefined threshold), a collection of favorite emojis (e.g., as previously specified by the user), and a collection of emojis directed to a topic (e.g., "Smileys and People").

In response to a user selection of an emoji in the menu 112, the emoji is displayed as a reaction to the message. For example, with reference to FIG. 1E, the graphical representation of the selected emoji 132 is shown in a reaction area 134 as a reaction to the message. In the depicted example, an icon 136 is displayed in the reaction area to provide a second entry point to menu 112. Additional user interfaces and methods for reacting to a message are described in detail herein.

Figure 1D:
FIG. 1D depicts an exemplary user interface of a group-based communication system, in accordance with some embodiments.

Upon a user selection of the user affordance 109, the electronic device displays one or more user interfaces for responding to the message. With reference to FIG. 1D, the electronic device displays a user affordance 122. The user affordance 122 allows the user to compose a new message as a response to the selected message 103. In the depicted example, the user affordance 122 allows the user to enter, edit, and format the message, which can comprise one or more text strings, images, emojis, and attachments. While the user interface 120 displays the user affordance 122 is a pane separate from the thread communication pane 102, it should be appreciated that the user affordance 122 can be displayed in other manners (e.g., underneath the message 103 within the channel panel 102).

While the user affordance 122 is provided in response to a user selection of the user affordance 109, it should be appreciated that the user affordance can be displayed without a user selection (e.g., in the channel pane).

When the user completes composing the response to the selected message (e.g., by selecting "Send" in the user affordance 122), the response is displayed in the thread communication pane 102. For example, with reference to FIG. 1E, the response ("Thanks! My reaction is above.") is shown in a response area 138 as a response to the message. The reaction area 136 and the response area 138, as shown in FIG. 1E, are two distinct areas.

FIGS. 2A-I, 3A-D, 4, and 5 illustrate additional user interfaces for reacting to a message in a group-based communication system. While the embodiments of the present disclosure are described in the context of a group-based communication system, it should be appreciated that they are not so limited. The user interfaces and methods for reacting to a message can be applied in any communication system (e.g., messaging systems, email systems).

Figure 2A:
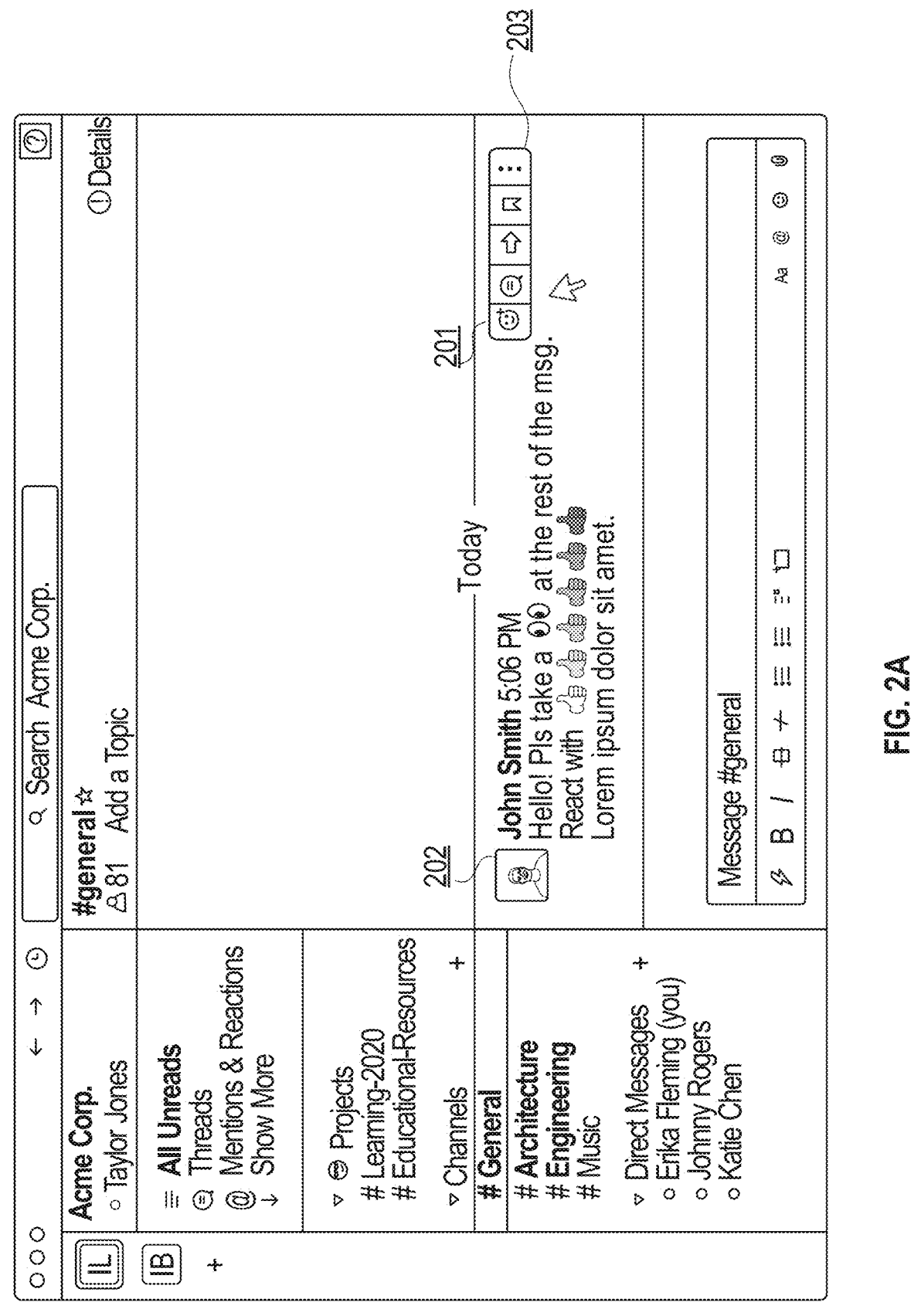
Figure 2B:
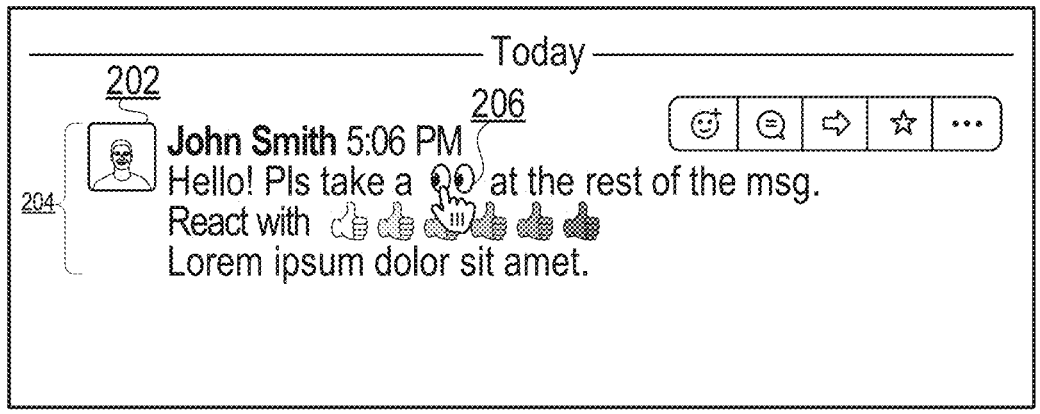
FIG. 2B depicts an exemplary user interface for reacting to a message in a group-based communication system, in accordance with some embodiments.

FIGS. 2A-G illustrate exemplary user interfaces for reacting to a message comprising one or more emojis, in accordance with some embodiments. With reference to FIG. 2A, an electronic device (e.g., a client device of a group-based communication system) receives a message from another channel member, John Smith (represented by icon 202). The message can comprise one or more text string, one or more emojis, one or more images, one or more attachments, or any combination thereof. The message includes text strings (e.g., "Hello! Pls . . . ") and multiple emojis. In some embodiments, the message is received from a server (e.g., a server of a group-based communication system) or a client device. As described with reference to FIGS. 1B-D, the user can react to the message by selecting the user affordance 201 of menu 203.

In some embodiments, the electronic device receives the message in one or more data structures (e.g., a JSON formatted representation), which can include data representing the various components of the message (e.g., text strings, emojis, images, attachments) and data specifying the style/formatting/positioning of these components. In some embodiments, the emoji within the message can be represented by image data or a reference to image data (e.g., a text identifier such as ":thumbsup:") in the data structure.

In some embodiments, the electronic device processes the message so that the emojis in the message can be rendered as selectable graphical representations. For example, the electronic device can parse the data structures representing the message to identify the emojis within the message, and retrieve the image data corresponding to the emojis. Rather than rendering the emojis as plain images or ASCII characters, the electronic device can automatically render the emojis as UI components (e.g., buttons) such that the user can interact with the emojis within the message by clicking on them, as shown in FIG. 2B.

In some embodiments, the processing of the message can be performed at the electronic device, at a server (e.g., a server of a group-based communication platform), or a combination thereof. For example, the server can receive the message (e.g., from John Smith's device), parse the data structures representing the message, and update the data structures to specify that the emojis are to be rendered as selectable graphical representations (e.g., buttons). The updated data structure can be then transmitted to the electronic device such that the message can be rendered accordingly.

With reference to FIG. 2B, the electronic device displays the message in a message area 204. The displayed message comprises selectable graphical representations of the emojis that can be selected as reactions (also referred to as reactive emojis). In other words, the eyes emoji 206 and the six thumbs-up emojis are all selectable by the user within the message. In some examples, based on the context of the message, a collection of one or more emojis may be recommended for display in the message using embeddings or other natural language processing techniques to determine emojis that correspond with the semantics of the message. The recommended collection of emojis may be presented to the user during composition of the message such that the user has the option to include the collection of emojis in the message that is posted.

Figure 2C:
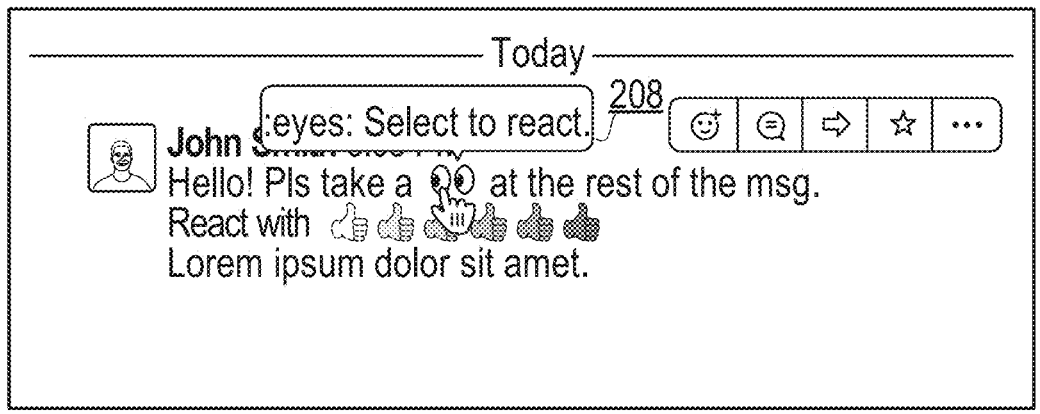
FIG. 2C depicts an exemplary user interface for reacting to a message in a group-based communication system, in accordance with some embodiments.

The electronic device can indicate that the emojis within the message are selectable. For example, as shown in FIG. 2C, when the cursor hovers over the eyes emoji 206, the electronic device displays the cursor as a hand to indicate that the emoji can be selected. In some embodiments, upon receiving a predetermined input (a hover input of predefined duration range, a tap input of predefined duration range), the electronic device can display an explanation of the emoji. For example, as shown in FIG. 2C, the explanation can be a tooltip 208 indicating the name of the emoji and its selectable nature. In some embodiments, the explanation can specify the input needed to select the emoji (e.g., tap and hold for 2 seconds, hold the Ctrl key and click).

The electronic device can receive, from the user, an input on the selectable graphical representation of the eyes emoji 206 in the displayed message in the message area 204. The input can be a voice command, a mouse click, a keyboard input, a tap on a touch-enabled display, a tap-and-hold (e.g., over a predefined duration), or any combination thereof (e.g., hold the Ctrl key and click). In some embodiments, the input for selecting the emoji 206 can vary depending on the type of the electronic device (e.g., desktop, smartphone) and the input devices connected to the electronic device (e.g., mouse, keyboard, touch-enabled display). The input can be specified by the electronic device, for example, using tooltip 208.

Figure 2D:
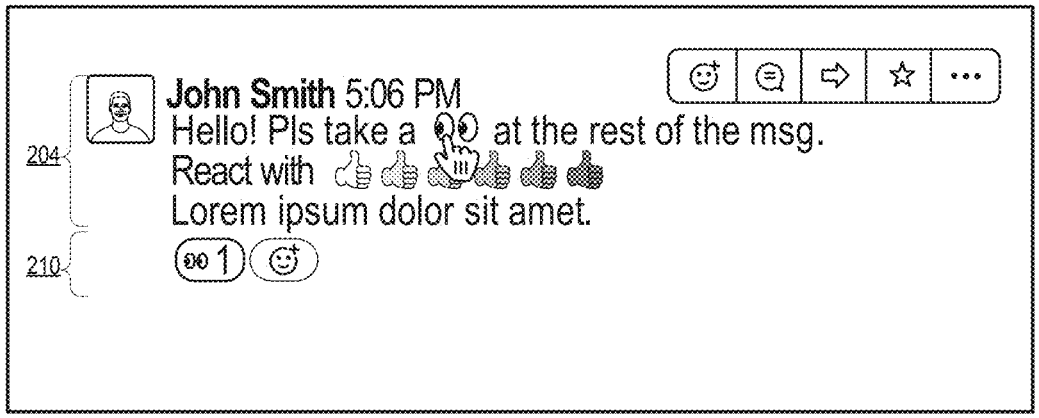
FIG. 2D depicts an exemplary user interface for reacting to a message in a group-based communication system, in accordance with some embodiments.

With reference to FIG. 2D, in response to receiving the input, the electronic device displays, in a reaction area 210, a reaction to the message based on the selected graphical representation. In the depicted example, the reaction area is underneath the message area. The reaction is identical to the selected emoji 206. In other words, the electronic device displays a separate instance of the eyes emoji in the reaction area 210 as a reaction to the message.

Reacting to a message is different from responding to the message in some embodiments. The user can react to the message using emojis only, and the emojis are accessible via the selectable graphical representations within the message or via user affordance 212 of FIG. 2E (the selection of which can cause an emoji menu to be displayed as described in FIGS. 1B-E). The reactions are shown in reaction area 210.

Figure 2E:
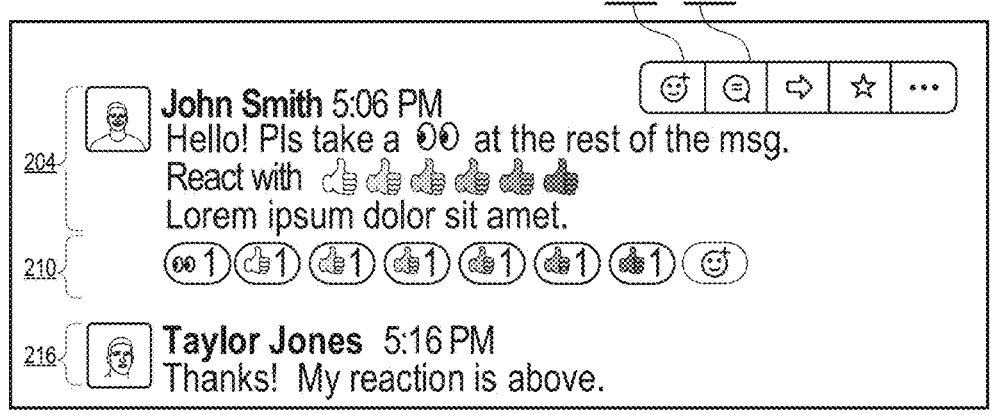
FIG. 2E depicts an exemplary user interface for reacting to a message in a group-based communication system, in accordance with some embodiments.

In contrast, the user interfaces for responding to the message and displaying the response are different. With reference to FIG. 2E, the user can respond to the message via user affordance 214 (the selection of which can cause a user affordance for composing a message to be displayed in a response area as described in FIGS. 1B-E and 2H-I). The response to the message by the user is shown in an area 216 (i.e., response area) different from the reaction area 210, as shown in FIG. 2E.

Also with reference to FIG. 2E, the user can select some or all of the selectable graphical representations within the message as reactions to the message. In the depicted example, the user has selected all of the selectable graphical representations within the message. Accordingly, the eyes emoji and the six thumbs-up emojis are displayed in the reaction area 210. An emoji can be selected multiple times by multiple users in the channel as their reactions to the message and the reaction area 210 can indicate the number of times the emoji was selected.

Figure 2F:
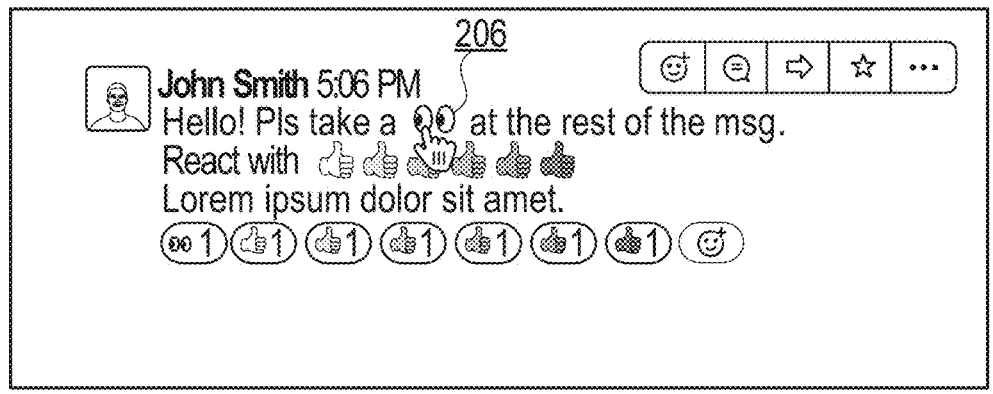
FIG. 2F depicts an exemplary user interface for reacting to a message in a group-based communication system, in accordance with some embodiments.
Figure 2G:
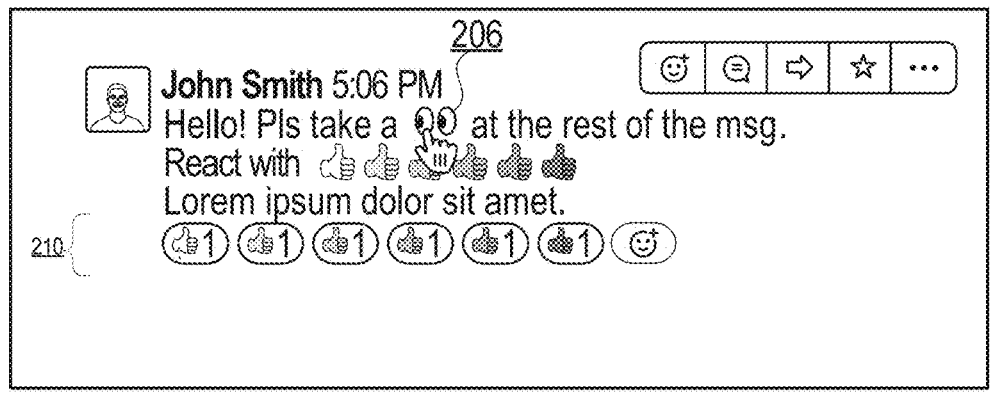
FIG. 2G depicts an exemplary user interface for reacting to a message in a group-based communication system, in accordance with some embodiments.

In some embodiments, the user can remove a reaction from the reaction area 210 by selecting the selectable graphical representation in the message area for a second time. In FIG. 2F, the user selects the emoji 206 within the message for a second time. In response to the second selection, the eyes emoji is removed from the reaction area 210, as shown in FIG. 2G. In some embodiments, a third selection of the eyes emoji 206 can cause the eyes emoji to be added back onto the reaction area 210. In other words, the selection of the eyes emoji can cause the reaction area to toggle between displaying the eyes emoji and not displaying the eyes emoji as a reaction). In some embodiments, the selection of the eyes emoji can be done via the selectable graphical representation 206, via a full emoji menu (e.g., menu 112), or a combination thereof.

In some embodiments, a user may not be able to use an emoji as a reaction. For example, the emoji may require special permission to use, and the user does not have permission to react using the emoji. As another example, the emoji is not installed at the electronic device. As another example, the emoji is not associated with the user's account.

In some embodiments, the electronic device and/or the server can make a determination as to whether a user can use an emoji before rendering the message. If it is determined that the user cannot use the emoji, the electronic device can display the emoji as disabled (e.g., not selectable or grayed out) in the message area. In some embodiments, the electronic device can provide follow-up user interfaces for installing the emoji (or associated emoji collection), requesting permission to use the emoji (or associated emoji collection), downloading the emoji (or associated emoji collection), purchasing the emoji (or associated emoji collection, or obtaining the emoji via other means. In some embodiments, if an emoji is not available to a user based on his/her organization's policies, the emoji is not displayed in the message. In some embodiments, a text version of the emoji is displayed for selection when the emoji cannot be rendered or is not available.

In some embodiments, the electronic device and/or the server can make a determination as to whether a user can use an emoji after the message is rendered and the user has selected the emoji as a reaction in the message area. For example, the electronic device sends a notification to the server, which can determine whether the user can use the selected emoji as a reaction. If not, the server can send a warning to the electronic device. After receiving the warning, the electronic device can notify the user that the reaction has failed, revert the reaction if it has been made, display the emoji in the message area as disabled, and/or provide follow-up user interfaces as described above.

Figure 2H:
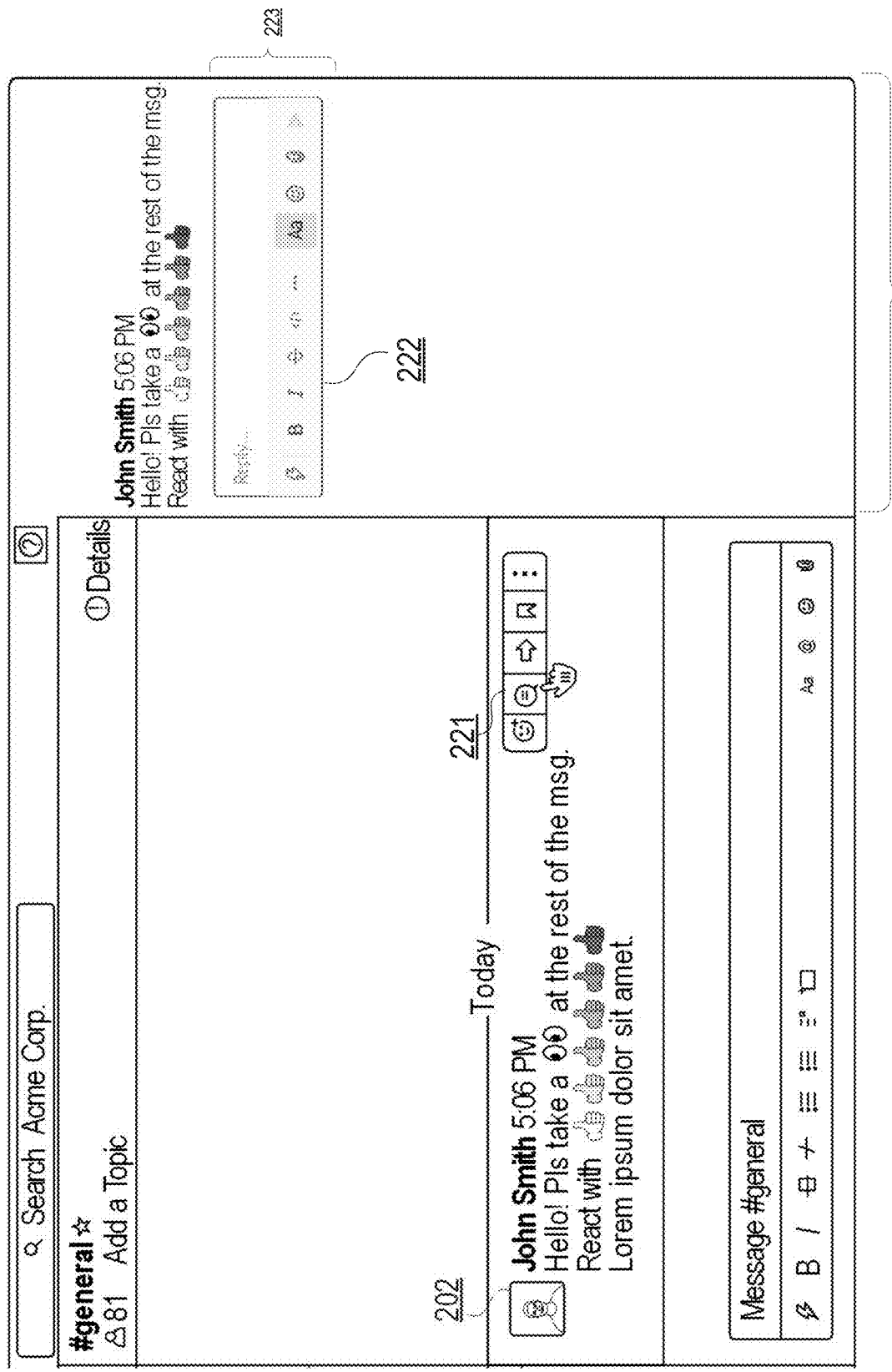
FIG. 2H depicts an exemplary user interface for reacting to a message in a group-based communication system, in accordance with some embodiments.

With reference to FIG. 2H, upon a user selection of the user affordance 221, the electronic device displays one or more user interfaces for responding to the message. The electronic device displays a response input area 223 comprising a user affordance 222 in a thread pane 230. The response input area allows the user to compose a new message as a response to the selected message. In some examples, the response input area is for responding to the message as a thread of the original message. In the depicted example, the user affordance 222 allows the user to enter, edit, and format the message, which can comprise one or more text strings, images, emojis, and attachments. While the user interface displays the user affordance 222 is in a thread pane separate from the channel pane, it should be appreciated that the user affordance 222 can be displayed in other manners (e.g., underneath the message within the channel panel).

The user can also react to the message from within the thread pane 230. Reacting to the message in the thread pane can result in the emoji being displayed in the channel pane.

While the user affordance 222 is provided in response to a user selection of the user affordance 211, it should be appreciated that the user affordance can be displayed without a user selection (e.g., in the channel pane).

When the user completes composing the response to the selected message (e.g., by selecting "Send" in the user affordance 222), the response is displayed in the channel pane. For example, with reference to FIG. 2I, the response ("Thanks! My reaction is above.") is shown in a response area 238 as a response to the message. The reaction area 234 and the response area 238, as shown in FIG. 2I, are two distinct areas.

Figure 3A:
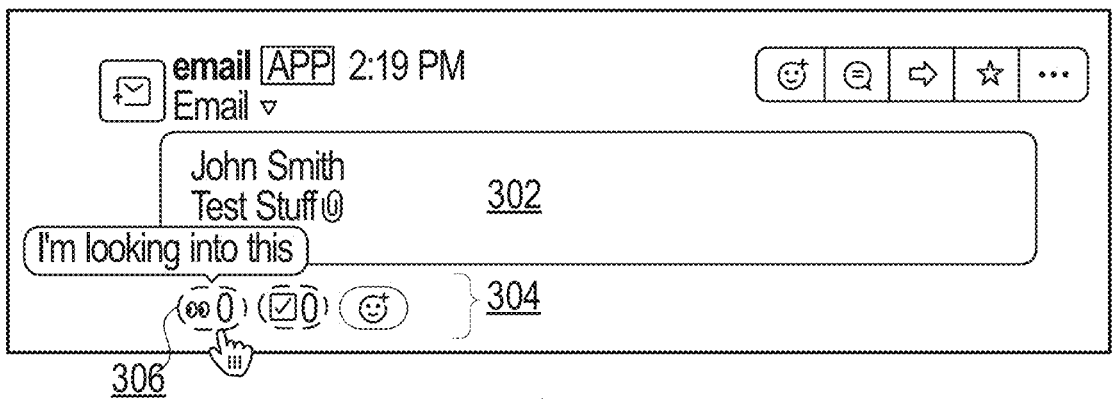
FIG. 3A depicts an exemplary user interface for reacting to a message in a group-based communication system, in accordance with some embodiments.

FIG. 3A-D illustrate exemplary user interfaces for reacting to a message, in accordance with some embodiments. With reference to FIG. 3A, an electronic device receives a message and displays the message in a message area 302. As depicted, the message received is an email message. In some embodiments, the message is displayed by a group-based communication system as discussed above with reference to FIGS. 1B-E and 2A-I.

The electronic device identifies, based on the message, one or more reactive emojis to recommend. The electronic device can identify the emojis based on the content of the message, the context of the message, or a combination thereof. The content of the message includes text strings, image data, emojis, attachments, or any combination thereof. The context of the message includes the sender identity, the time stamp, other metadata associated with the message, how the message relates to the rest of the conversation (e.g., whether it is a part of a thread), frequently used emojis in the present channel (e.g., usage above a predefined threshold), or any combination thereof. In some embodiments, the electronic device can analyze (e.g., parse) the message based on one or more predefined rules to identify what emojis to recommend as reactions. In some embodiments, after one or more reactive emojis (e.g., thumb-up emoji) are identified, additional emojis that are likely to be found together as reactions (e.g., thumbs-down emoji) can be identified.

For example, with reference to FIG. 3A, the message is an email message with an attachment and the email message is sent via an application (i.e., the Email App). Based on some or all of these parameters, the electronic device can determine to recommend an eyes emoji and a check mark emoji.

The electronic device can identify the emojis based on the content of the message, the context of the message, or a combination thereof. In some embodiments, one or more rules can associate predefined keywords with emojis. In some embodiments, one or more rules can associate certain context with emojis. The context can be derived by parsing the text string (e.g., using semantic parsing, natural language processing techniques, embeddings, etc.).

In some embodiments, processing of the message to determine reactive emojis can be performed by the electronic device, another client device, one or more servers, or a combination thereof. For example, the parsing and rule-based recommendation of emojis can be performed by a server, which transmits the recommended emojis to the electronic device to be displayed in the reaction area of the message.

The electronic device can display one or more graphical representations of the one or more reactive emojis. With reference to FIG. 3A, the electronic device displays the graphical representations of the identified emojis (eyes emoji and check emoji) in a reaction area 304. As shown, the graphical representations are shown to be inactive, indicating that the graphical representations have not been selected. An inactive version of a graphical representation can be indicated in many manners (e.g., a grayed out version of the graphical representation, a version with dash lines rather than solid lines, some other muted manners.)

In some embodiments, the electronic device can provide an explanation of the graphical representations of the reactive emojis upon receiving a predefined user input. With reference to FIG. 3A, when the cursor hovers over a selectable graphical representation 306, the electronic device displays a tooltip providing an explanation of the graphical representation. Similarly, with reference to FIG. 3B, when the cursor hovers over a selectable graphical representation 308, the electronic device displays a tooltip providing an explanation of the graphical representation 308. In some embodiments, the tooltip can further indicate that a selection of the graphical representation would trigger a reaction and/or specify the selection (e.g., click, tap, tap-and-hold).

Figure 3B:
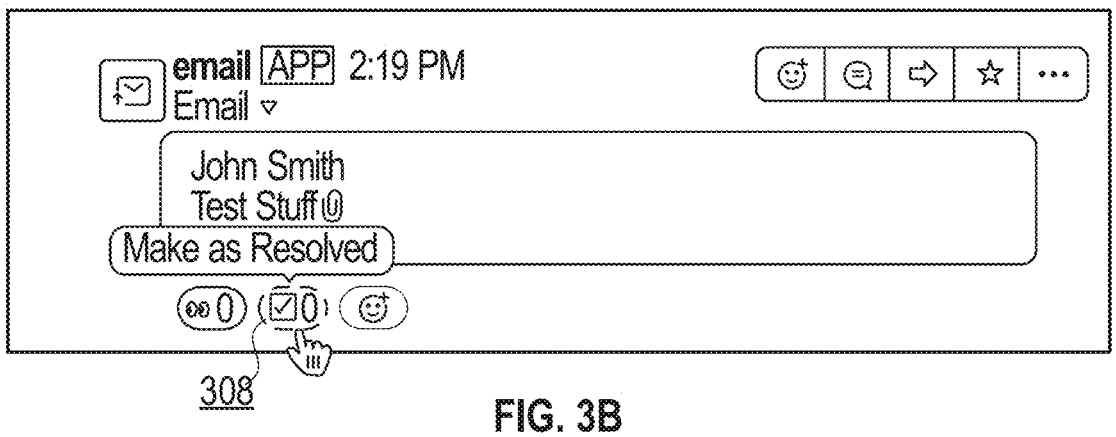
FIG. 3B depicts an exemplary user interface for reacting to a message in a group-based communication system, in accordance with some embodiments.
Figure 3C:
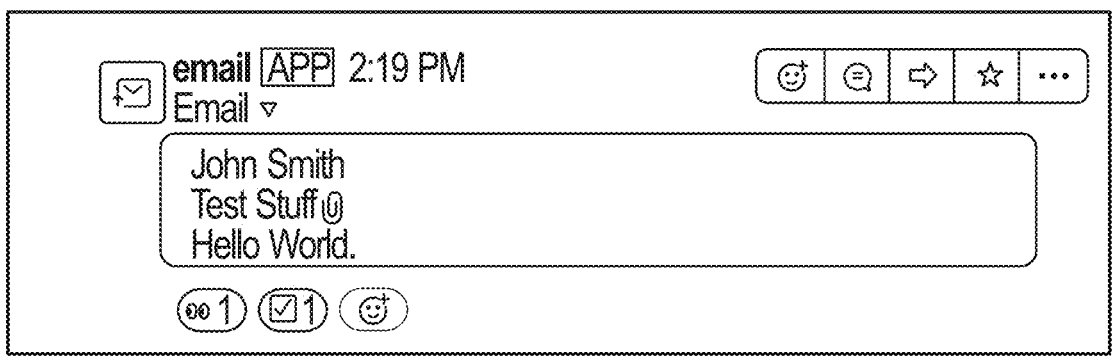
FIG. 3C depicts an exemplary user interface for reacting to a message in a group-based communication system, in accordance with some embodiments.

The electronic device can receive, from a user, an input selecting a graphical representation of the one or more reactive graphical representations and, in response to receiving the input, display a reaction to the message in a reaction area. With reference to FIG. 3B, after the electronic device receives a selection of the eyes emoji 306, the electronic device displays the reaction in the reaction area 304. Here, displaying the reaction comprises updating the display of the emoji 306 so as to display an active version of the emoji (e.g., without any grayed-out or other muted effects). Similarly, with reference to FIG. 3C, after the electronic device receives a selection of the check emoji 308, the electronic device displays the reaction in the reaction area 304 by displaying an active version of the check emoji.

Figure 3D:
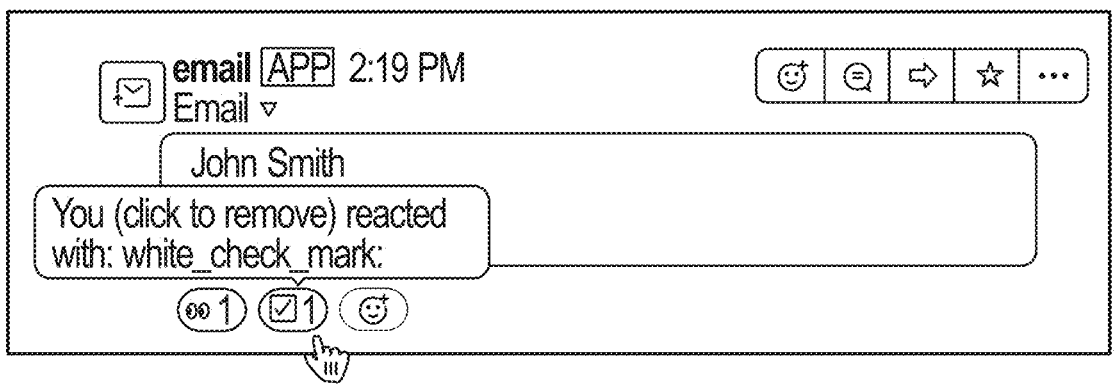
FIG. 3D depicts an exemplary user interface for reacting to a message in a group-based communication system, in accordance with some embodiments.

In some embodiments, the selections of a reactive emoji can cause the reaction area to toggle between displaying an active version of a reactive emoji and displaying an inactive version of the reactive emoji. In some embodiments, the selections of a reactive emoji can be done via the selectable graphical representation 306, via a full emoji menu (e.g., menu 112), or a combination thereof. With reference to FIG. 3D, the electronic device can provide an explanation of the reactive emoji based on a current state of the reactive emoji. As shown, when the reactive emoji is in an active state, the tooltip indicates that the reactive emoji has been selected as a reaction and that the user can click to inactivate the emoji.

The electronic device can display a response input area for inputting a response to the message. The response input area is distinct from the reaction area 304. In some embodiments, the response input area is displayed underneath the reaction area 304 and includes a user affordance (e.g., user affordance 122 or 222) for composing a new message. In some embodiments, the response input area is displayed in a different pane from the channel pane, as shown in FIGS. 1D and 2H. As described above, responding to a message can be distinct from reacting to the message. The areas for inputting reactions (e.g., area 304) and inputting responses (e.g., user affordance 122) are distinct, and the areas for displaying reactions (e.g., area 304) and displaying responses (e.g., response area 138) are also distinct.

Figure 4:
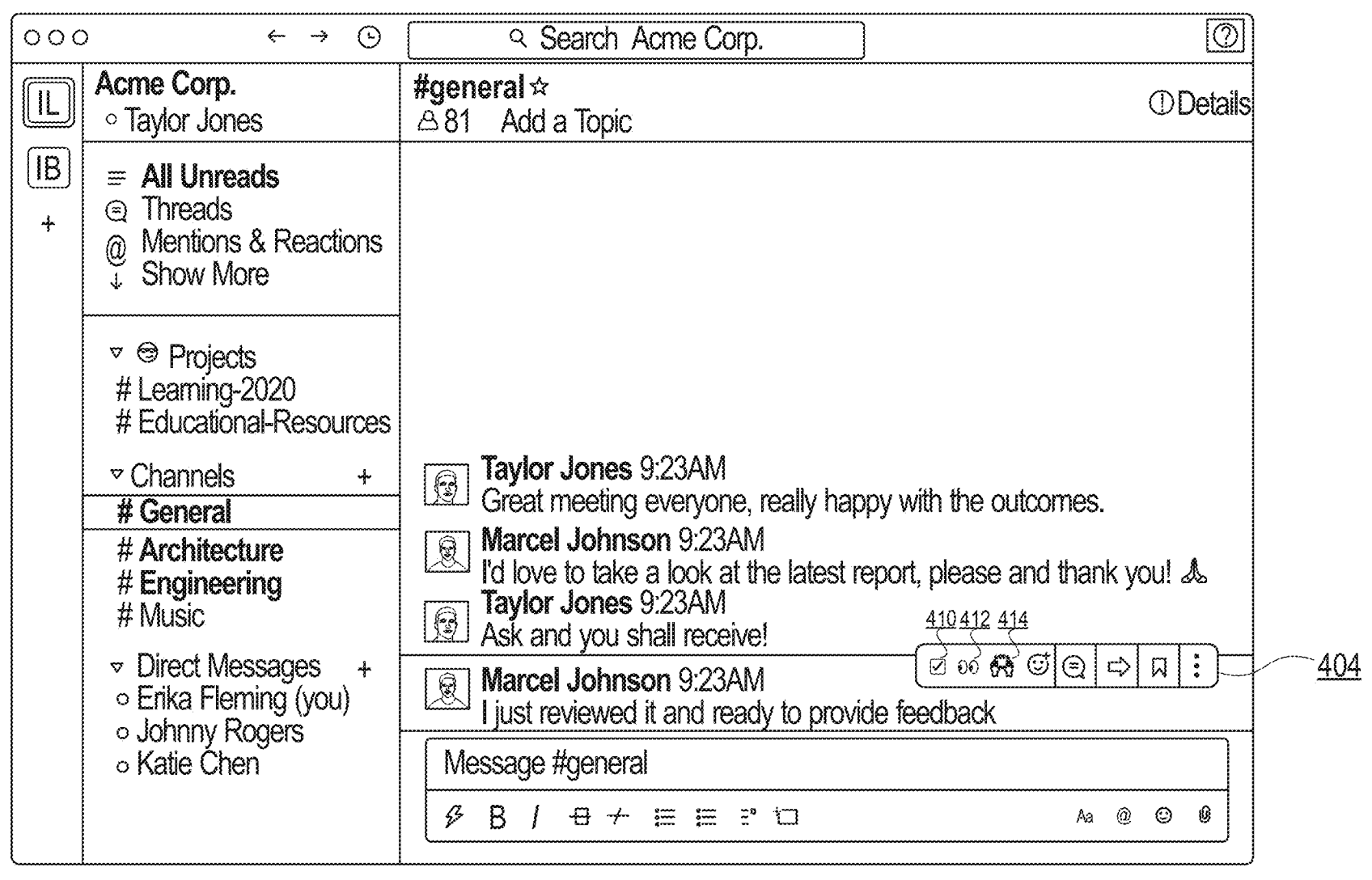

FIG. 4 illustrates another exemplary user interface for reacting to a message, in accordance with some embodiments. An electronic device receives a message and displays the message in a message area 402. The message comprises a text string ("I just reviewed it and ready to provide feedback").

The electronic device identifies, based on the message, one or more reactive emojis to recommend. As discussed above, the electronic device can identify the emojis based on the content of the message, the context of the message, or a combination thereof. In some embodiments, one or more rules can associate predefined keywords with emojis. For example, the word "review" can be pre-associated with the eyes emoji and the check emoji (as shown by 410 and 412). In some embodiments, one or more rules can associate certain context with emojis. For example, if the message refers to a file that the user shared in the channel earlier, a high-five emoji is provided (as shown by 414). The context can be derived by parsing the text string (e.g., using semantic parsing, natural language processing techniques, embeddings, etc.).

In some embodiments, processing of the message to determine reactive emojis can be performed by the electronic device, another client device, one or more servers, or a combination thereof. For example, the parsing and rule-based recommendation of emojis can be performed by a server, which transmits the recommended emojis to the electronic device to be displayed in the reaction area of the message.

With reference to FIG. 4, the electronic device displays one or more graphical representations of the one or more reactive emojis via a menu (i.e., menu 404). In some embodiments, the menu 404 is displayed responsive to a user input (e.g., a hover input over the message).

Figure 5:
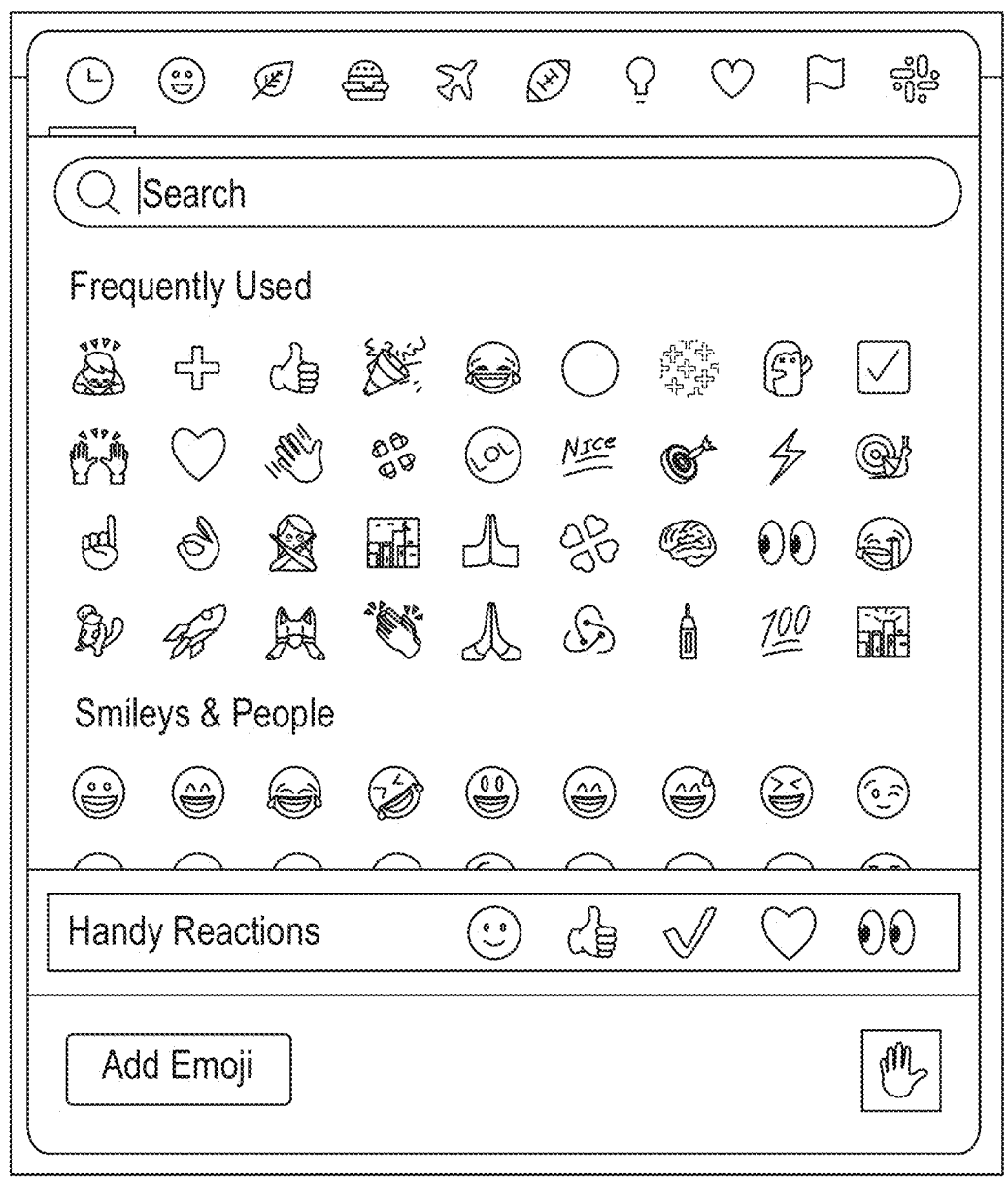
FIG. 5 depicts an exemplary emoji menu in a group-based communication system, in accordance with some embodiments.

FIG. 5 depicts another example of a menu. Emoji menu 504 can be displayed responsive to a user input (e.g., a selection of user affordance 108 of FIG. 1C or 136 of FIG. 1E). The emoji menu 504 comprises a section 506 ("Handy Reactions") for displaying the one or more reactive emojis identified based on the message.

With reference to FIGS. 4 and 5, the electronic device can receive, from a user, an input selecting a graphical representation of the one or more reactive graphical representations (e.g., from menu 404 or menu 504) and in response to receiving the input, displaying a reaction to the message in a reaction area, as shown in FIGS. 1E and 2I. The electronic device can display a response input area (e.g., user affordance 122 or 222) for inputting a response to the message, as shown in FIGS. 1D and 2H.

As described above with reference to FIGS. 2A-I, a user may not be able to use an emoji as a reaction. In some embodiments, the electronic device and/or the server can make a determination as to whether a user can use an emoji before rendering the message. If it is determined that the user cannot use the emoji, the electronic device can display the emoji as disabled (e.g., not selectable) in the area 304, menu 404, and/or emoji menu 504. In some embodiments, the electronic device can forego displaying the emoji from the area 304, menu 404, and/or emoji menu 504. In some embodiments, the emoji is rendered as text or ASCII characters. In some embodiments, the electronic device can provide follow-up user interfaces for installing the emoji (or associated emoji collection), requesting permission to use the emoji (or associated emoji collection), downloading the emoji (or associated emoji collection), purchasing the emoji (or associated emoji collection, or obtaining the emoji via other means.

In some embodiments, the electronic device and/or the server can make a determination as to whether a user can use an emoji after the user has selected the emoji as a reaction from the area 304, menu 404, and/or emoji menu 504. For example, the electronic device sends a notification to the server, which can determine whether the user can use the selected emoji as a reaction. If not, the server can send a warning to the electronic device. After receiving the warning, the electronic device can notify the user that the reaction has failed, revert the reaction if it has been made, display the emoji in the area 304, menu 404, and/or emoji menu 504 as disabled (or remove the emoji), and/or provide follow-up user interfaces as described above.

In some embodiments, in response to receiving a user selection of a reactive emoji (e.g., from message area 204, area 304, menu 404, and/or emoji menu 504), the electronic device can launch an application and/or trigger a workflow associated with the selected emoji. For example, a ticket emoji, when clicked, results in a ticket also being filed. In some embodiments, the selected emoji is associated with an API that causes an application or workflow to be launched.

FIG. 6A illustrates process 600, according to various examples. Process 600 is performed, for example, using one or more electronic devices implementing a software platform. In some examples, process 600 is performed using a client-server system, and the blocks of process 600 are divided up in any manner between the server and a client device. In other examples, the blocks of process 600 are divided up between the server and multiple client devices. Thus, while portions of process 600 are described herein as being performed by particular devices of a client-server system, it will be appreciated that process 600 is not so limited. In other examples, process 600 is performed using only a client device or only multiple client devices. In process 600, some blocks are, optionally, combined, the order of some blocks is, optionally, changed, and some blocks are, optionally, omitted. In some examples, additional steps may be performed in combination with the process 600. Accordingly, the operations as illustrated (and described in greater detail below) are exemplary by nature and, as such, should not be viewed as limiting.

At block 602, an exemplary system (e.g., one or more electronic devices) displays the message in a message area (e.g., message area 302). At block 604, the system identifies, based on the message, one or more reactive emojis (e.g., emojis 306, 308, 410, 412, 414, Handy Reactions in FIG. 5). At block 606, the system displays one or more graphical representations of the one or more reactive emojis. At block 608, the system receives, from a user, an input selecting a graphical representation of the one or more reactive graphical representations. At block 610, the system, in response to receiving the input, displays a reaction to the message in a reaction area (e.g., reaction area 304). At block 612, the system displays a response input area for inputting a response to the message (e.g., response input area 223).

In some embodiments, displaying the graphical representations involves displaying inactive versions (e.g., grayed out versions) of the graphical representations in the reaction area. In some embodiments, displaying the reaction to the message involves displaying an active version of the selected graphical representation in the reaction area (e.g., FIG. 3C).

In some embodiments, the one or more reactive emojis are identified based on semantic context of the message.

In some embodiments, the system determines whether a user has permission to use an emoji of the one or more reactive emojis. In accordance with a determination that the user does not have permission to use the emoji, the system displays a disabled version of the emoji.

In some embodiments, a user interface is displayed for installing the emoji.

In some embodiments, identifying the one or more emojis includes determining that the message includes a file. In some embodiments, the one or more emojis is identified based on the file.

In some embodiments, one or more emojis are identified based on a determination that the message includes a keyword and the keyword is mapped to a predetermined emoji.

In some embodiments, the system launches an application associated with the selected graphical representation in response to the user selecting an emoji.

FIG. 6B illustrates process 650, according to various examples. Process 650 is performed, for example, using one or more electronic devices implementing a software platform. In some examples, process 650 is performed using a client-server system, and the blocks of process 650 are divided up in any manner between the server and a client device. In other examples, the blocks of process 650 are divided up between the server and multiple client devices. Thus, while portions of process 650 are described herein as being performed by particular devices of a client-server system, it will be appreciated that process 650 is not so limited. In other examples, process 650 is performed using only a client device or only multiple client devices. In process 650, some blocks are, optionally, combined, the order of some blocks is, optionally, changed, and some blocks are, optionally, omitted. In some examples, additional steps may be performed in combination with the process 650. Accordingly, the operations as illustrated (and described in greater detail below) are exemplary by nature and, as such, should not be viewed as limiting.

At block 652, a system (e.g., one or more electronic devices including a user computing device) displays a message comprising one or more emojis in a message area (e.g., message area 204), wherein the displayed message comprises one or more selectable graphical representations of the one or more emojis (e.g., emoji 206). At block 654, the system receives, from a user, an input on a selectable graphical representation of the one or more selectable graphical representations in the displayed message (e.g., FIG. 2B). At block 656, the system, in response to receiving the input, displays, in a reaction area (e.g., reaction area 210) different from the message area, a reaction to the message based on the selected graphical representation.

In some embodiments, one or more emojis is identified based on a keyword used in the message.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

What is claimed is:

1. A method, comprising:
    causing a message to be displayed in a group-based communication channel of a group-based communication system, the message comprising one or more reactive emojis that include selectable graphical representations of keywords in the message;
    receiving a user input associated with at least one of the one or more reactive emojis that include the selectable graphical representations of the keywords in the message that is displayed in the group-based communication channel of the group-based communication system; and
    causing, in response to the user input, a reaction to the message to be displayed in the group-based communication channel of the group-based communication system, wherein the reaction and the message are displayed in separate areas of the group-based communication channel.

2. The method of claim 1, further comprising:
    identifying the one or more reactive emojis to be rendered within the message based at least in part on parsing one or more data structures that represent the message.

3. An apparatus, comprising:
    at least one processor;
    at least one memory coupled with the at least one processor; and
    instructions stored in the at least one memory and executable by the at least one processor to cause the apparatus to:
        cause a message to be displayed in a group-based communication channel of a group-based communication system, the message comprising one or more reactive emojis that include selectable graphical representations of keywords in the message;
        receive a user input associated with at least one of the one or more reactive emojis that include the selectable graphical representations of the keywords in the message that is displayed in the group-based communication channel of the group-based communication system; and
        cause, in response to the user input, a reaction to the message to be displayed in the group-based communication channel of the group-based communication system, wherein the reaction and the message are displayed in separate areas of the group-based communication channel.

4. The apparatus of claim 3, wherein the instructions are further executable by the at least one processor to cause the apparatus to:

identify the one or more reactive emojis to be rendered within the message based at least in part on parsing one or more data structures that represent the message.

5. A non-transitory computer-readable medium storing one or more programs that comprise instructions executable by at least one processor to:

cause a message to be displayed in a group-based communication channel of a group-based communication system, the message comprising one or more reactive emojis that include selectable graphical representations of keywords in the message;

receive a user input associated with at least one of the one or more reactive emojis that include the selectable graphical representations of the keywords in the message that is displayed in the group-based communication channel of the group-based communication system; and cause, in response to the user input, a reaction to the message to be displayed in the group-based communication channel of the group-based communication system, wherein the reaction and the message are displayed in separate areas of the group-based communication channel.

6. The non-transitory computer-readable medium of claim 5, wherein the instructions are further executable by the at least one processor to:

identify the one or more reactive emojis to be rendered within the message based at least in part on parsing one or more data structures that represent the message.

* * * * *